Patented Mar. 4, 1952

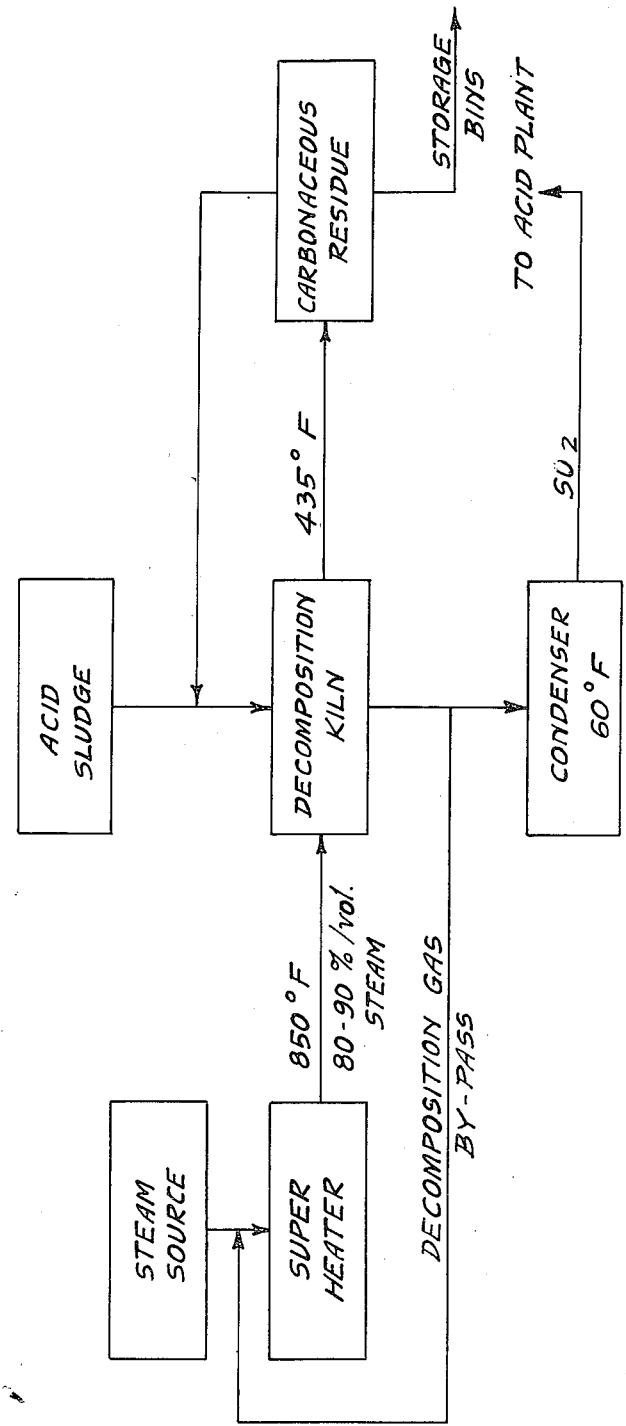

2,587,640

UNITED STATES PATENT OFFICE 2,587,640

RECOVERY OF ACID VALUES FROM PETROLEUM REFINING SULFURIC ACID SLUDGES

Hunter Miley, Petrolia, Pa., assignor to L. Sonneborn Sons, Inc., a corporation of Delaware Application August 12, 1947, Serial No. 768,113

10 Claims. (Cl. 23—177)

This invention relates to new and useful improvements in the recovery of acid values from petroleum refining sulfuric acid sludges.

Conventional refining of petroleum hydrocarbons includes treatment with sulfuric acid either as such or in the form of fuming sulfuric acid or $SO_3$. Such treatment results in the formation of acid sludges which are essentially composed of sulfuric acid, sulfonates and hydrocarbon material. Large quantities of these acid sludges are produced in the oil industry and the recovery of sulfuric acid values therefrom presents a major problem.

Petroleum refining sulfuric sludges when heated to temperatures in excess of 500° F. are substantially decomposed into gaseous decomposition products comprising $SO_2$, water and oil vapors and a carbonaceous residual material usually referred to as coke. Various methods have been proposed in the past for the recovery of acid values from these sludges utilizing this thermal decomposition. One such method involves decomposition of the sludge by direct contact with hot combustion gases. This practice results in considerable dilution of the $SO_2$ gas mixture. For this reason the application of this method is limited to the processing of acid sludges low in oil content since a high oil content produces in this method a relatively large volume of combustion gases which render the $SO_2$ bearing vapors too dilute for economical conversion to $H_2SO_4$.

Another process that has been proposed involves the use of hot solids such as sand, metal balls or the like. These are heated to above the decomposition temperature of the sludge and are then contacted with the latter. Though this process has advantages over the first mentioned method it requires expensive equipment and is expensive to operate.

One object of the invention comprises inter alia a relatively simple, efficient and economical method for the recovery of acid values from petroleum refining sulfuric acid sludges. This and further objects of the invention will be seen from the following description.

The invention broadly comprises subjecting a petroleum refining sulfuric acid sludge to a superheated gas in heat exchange relation therewith, said gas containing at least 75% by volume of steam and being heated to a temperature above the decomposition temperature of said sludge, thereafter subjecting the gaseous decomposition products to water condensation and recovering $SO_2$ gas of high purity.

The acid sludge that may be subjected to the method in accordance with the invention may be any suitable petroleum refining sulfuric acid sludge and regardless whether the same is of relatively high or of relatively low oil content.

The superheated gas as stated should contain at least 75% steam. If desired it may comprise substantially 100% steam. Within the preferred embodiment of the invention however it is found of advantage to use a superheated gas containing from 80 to 90% of steam. The superheating of the gas is conducted in any conventional manner such as by circulating through a superheater until the gas with its requisite steam content has reached the desired temperature at which it is to be passed into the decomposition zone for decomposing contact with the acid sludge. The steam content of at least 75% by volume is critical in that a gas mixture with less than 75% by volume steam will give rise to cracking of hydrocarbon material resulting in the formation of non-condensable hydrocarbons which are difficult to remove from the $SO_2$ bearing vapors in the condensation step. Furthermore, a minimum of 75% by volume of steam was found critical as an effective scavenger agent for hydrocarbons and hydrocarbon vapors in the water condensation step of the $SO_2$ bearing gaseous decomposition products issuing from the decomposition zone.

By way of a preferred embodiment of the invention I have found it of advantage to bypass part of the gaseous decomposition product from the decomposition zone prior to its reaching the condenser. This bypassed material is adjusted to requisite volume percent steam content and thereafter superheated to the desired temperature and passed into the decomposition zone for the thermal decomposition of the acid sludge therein. Proceeding in this manner is particularly economical since the gas mixture issuing from the decomposition zone is already hot, usually between 400 and 500° F., and contains a relatively large volume percentage of water. This mixture then requires only a relatively small heat input after adjustment to the requisite steam content of a minimum of 75% in order to bring it to the superheated temperature desired for the thermal decomposition of the sludge.

In most cases I find it of advantage and prefer to superheat the steam containing gas mixture to a temperature between 800 and 900° F.

The decomposition zone within which the thermal decomposition of the acid sludge is obtained may be for instance defined by a kiln preferably of the rotary type as is conventionally used in hitherto known acid sludge recovery procedures. In these the sludge feeds or is fed into the kiln passing through three main decomposition phases, i. e., liquid, semi-liquid and finally a solid residual coke. In going through the semi-liquid stage large balls of gummy material like big masses of dough are formed which must be broken up, kneaded and mixed to keep the kiln from being clogged. This is usually accomplished by steel rods or bars that are lifted and dropped on the material as the kiln revolves.

Alternatively a suitable kiln or decomposition chamber may be one in which the solid or semi-solid coke is constantly broken up or prevented from baking into a large solid mass by the use of a cylinder or large pipe with helicoid flights similar to a screw conveyor which is placed loose in the kiln. As the kiln revolves this will cause the helicoid roller to revolve effecting a screw action which will mix the coke and sludge, break up any lumps of coke that may form and carry the material to the coke exit end of the kiln. Such an arrangement is for instance shown in my copending application, Ser. No. 768,112. In all cases when proceeding in accordance with the invention, it is of advantage to pass the steam containing gas mixture in countercurrent heat exchange relation to the acid sludge.

The gaseous $SO_2$ bearing decomposition products issuing from the decomposition zone (except as to any portion that may be bypassed for recycling) are subjected to a water condensation step in the conventional manner. This is effected by cooling down to at least 200° F. and preferably down to 60° F. In the condensation step the condensing steam (at least 75%) will remove even minute particles of oil vapor from the gas mixture. The issuing gas is an $SO_2$ gas of high purity analyzing in most cases in excess of 95% and as high as 98% $SO_2$ by volume, which can be used as such for the conventional conversion to sulfuric acid.

Within the scope of my invention and as a further embodiment thereof a comparatively large volume of the carbonaceous material as it comes from the acid sludge decomposition and preferably without further heating the same is brought to the sludge feed end of the decomposition zone for admixture with the acid sludge. The amount of carbonaceous residue material admixed with the sludge may be as high as five parts by weight of such material for one part by weight of the sludge. The use of carbonaceous material in this manner has the advantage that acid sludge decomposition is accelerated and carried to completion with the absorption of less heat. For example, a sample of acid sludge was decomposed and found to require 510° F. temperature to produce an acid free coke. The same sludge when mixed with five parts by weight of carbonaceous material obtained in its decomposition, required only 435° F. temperature to produce an acid free coke. This therefore involves a saving in heat input and renders the procedure more economical. Furthermore since it permits a lowering of the sludge decomposition temperature, volatile matter is not driven off and the resultant carbonaceous residue is considerably higher in fuel value than is the case when the process is carried on without the addition of carbonaceous matter to the acid sludge. In this manner the resultant carbonaceous material can be used for heating the superheater thereby rendering this phase of the operation also more economical due to the higher fuel value of this carbonaceous residual material.

The practical operation of the invention is illustrated by way of example in connection with the accompanying flow sheet. As there shown a stream of acid sludge is substantially continuously passed into the decomposition kiln. Steam from a suitable steam source is heated by circulating through a superheater to a temperature of about 850° F. and is substantially continuously passed into the decomposition kiln preferably countercurrent to the stream of acid sludge. Carbonaceous residue material is continuously removed from the decomposition kiln at a temperature of about 435° F. The same may be partly recycled if desired for admixture with the acid sludge, the mixture to be then continuously fed into the kiln. The carbonaceous residue or non-recycled portion thereof is passed to storage bins. The gaseous decomposition products continuously issuing from the kiln are continuously passed into a condenser in which they are cooled to a temperature of about 60° F., thereby removing water and oil vapors. High purity $SO_2$ gas is then passed from the condenser to the acid plant. If desired, part of the gaseous decomposition products continuously issuing from the decomposition kiln may be in part by-passed for adjustment to the proper steam content to be used as the gas to be superheated and passed back into the system.

The foregoing description is for purposes of illustration and not of limitation and it is therefore my intention that the invention be limited only by the appended claims or their equivalents wherein I have endeavored to claim broadly all inherent novelty.

I claim:

1. Method for the recovery of acid values from petroleum refining sulfuric acid sludges which comprises substantially continuously passing a stream of acid sludge into a decomposition zone, substantially continuously passing a superheated gas into said zone in heat exchange relation with said sludge said gas containing at least 75% by volume of steam and being heated to a temperature in excess of 500° F., substantially maintaining said temperature sufficiently high and the contact between said sludge and said gas for a period sufficient to substantially coke the major portion of the hydrocarbon material in said sludge, substantially continuously removing coked material from said zone, substantially continuously removing gaseous decomposition products from said zone, substantially continuously subjecting said gaseous decomposition products to water condensation and substantially continuously recovering $SO_2$ gas of high purity.

2. Method according to claim 1 in which said gas is heated to a temperature of from 800 to 900° F.

3. Method according to claim 1 in which said gas contains 80 to 90% by volume of steam.

4. Method according to claim 1 in which at least part of said gaseous decomposition products are substantially continuously adjusted to a steam content of at least 75% by volume and thereafter superheated to constitute said superheated gas.

5. Method according to claim 4 in which said gas is superheated to a temperature from 800 to 900° F.

6. Method according to claim 1 in which at least part of said coked material is substantially continuously recycled for admixture with said acid sludge before passing the same into said decomposition zone said admixture being in amount up to substantially five times the weight of said sludge.

7. Method according to claim 6 in which at least part of said gaseous decomposition products are substantially continuously adjusted to a steam content of at least 75% by volume and thereafter superheated to constitute said superheated gas.

8. Method according to claim 1 in which at least part of said gaseous decomposition products are substantially continuously adjusted to a steam content of at least 75% by volume and thereafter superheated to constitute said superheated gas and in which at least part of said coked material is substantially continuously recycled for admixture with said acid sludge before passing the same into said decomposition zone said admixture being in amount up to substantially five times the weight of said sludge.

9. Method according to claim 8 in which said gas is superheated to a temperature of from 800 to 900° F.

10. Method according to claim 8 in which said gas is superheated to a temperature of from 800 to 900° F. and in which said gaseous decomposition products are adjusted to a steam content of substantially 80 to 90% by volume.

HUNTER MILEY.

REFERENCES CITED

The following references are of record in the file of this patent:

UNITED STATES PATENTS

| Number | Name | Date |
| --- | --- | --- |
| 1,511,721 | Davis et al. | Oct. 14, 1924 |
| 2,016,721 | Kunze | Oct. 8, 1935 |
| 2,028,725 | Rumple | Jan. 21, 1936 |
| 2,435,710 | Collier et al. | Feb. 10, 1948 |
| 2,467,855 | Read | Apr. 19, 1949 |